March 26, 1968     M. N. MURRAY     3,374,538

METHOD FOR MAKING CAPACITOR END CAP

Filed May 3, 1965

INVENTOR.
MYLES N. MURRAY
BY
Oberlin, Maky & Donnelly
ATTORNEYS

United States Patent Office 3,374,538
Patented Mar. 26, 1968

3,374,538
METHOD FOR MAKING CAPACITOR END CAP
Myles N. Murray, Chagrin Falls, Ohio, assignor to Industrial Electronic Rubber Company, Twinsburg, Ohio, a corporation of Ohio
Filed May 3, 1965, Ser. No. 452,490
8 Claims. (Cl. 29—627)

ABSTRACT OF THE DISCLOSURE

Method and apparatus for making a capacitor end cap having a major body part molded about a terminal, with one end of the latter projecting from one end of this body part and the other terminal end exposed in a recess at the other end of the part. A connector wire is welded to the terminal end within the recess, and the recess is then filled with settable composition to form a minor part of the cap fully imbedding the welded joint and being substantially flush with the end of the major part.

---

This invention relates to an improved method for manufacture of end caps or headers of the general type commonly used in electrolytic capacitors and to apparatus for the practice of such method.

As is well-known in the capacitor art, the electrolytic capacitor structure most commonly employed comprises a metal can closed at one end and open at the other, with a cap for closing in sealed relation such open end of the container or can. The cap, also referred to as a header, is made of a suitable inert and insulative material with a number of synthetic resins having been utilized for the purpose, and there must be provided means for establishing a connection through the cap. Such electrical connecting means has previously been provided by welding a wire to a metal insert, with this two-part pre-assembly then being placed in a mold for molding of the end cap body thereabout.

In order that the foregoing molding operation can properly be accomplished, it being understood that the wire must extend from the outer face of the finished end cap, the metal insert of the assembly is exposed at the inner face for contact with the inner electrode of the capacitor, the insert must not only be properly seated in a mold cavity which will provide the indicated partial exposure of the same, but the mold must also have a passage for extension of the wire beyond the cavity. This manner of forming the header or end cap thus imposes special requirements on the mold employed and these, in turn, actually limit the flexibility or range of use of the molding apparatus. The pre-welded insert and wire are relied upon to center and support this connector assembly in the cavity, with the result that the two such components must be on a common axis for proper centered support during the molding operation, and this requirement could be a limitation in precluding a connector assembly in which the wire is, for one reason or another, preferably offset from the axis of the insert. Moreover, since the top mold piece must pass the wire in reasonably close fit, a given top mold part on this order is limited to the particular selected size of wire intended to be used.

The present improvements avoid the above-noted difficulties of manufacture, as a primary objective, in producing such a capacitor end cap or header having a molded body about the metal insert and, at the outer face, a recess in which the upper or outer end of the insert is exposed for subsequent attachment, such as by welding, of the wire connector.

It is also an object of this invention to provide a molding technique productive of a new cap form as set forth above and especially carried out to facilitate subsequent weld attachment of the wire component of the connector assembly.

It is another object to provide method and apparatus for making end caps for electrolytic capacitors and the like in which various sizes of wire connectors can be employed as desired and, furthermore, the wire connections can be laterally offset with respect to the axis of the molded-in insert.

It is a further object of the invention to provide a method of making such an end cap in which a body of a moldable composition is molded in desired configuration about a metal insert so as partially to enclose the same, with both ends of the insert exposed and available for electric connection without further treating thereof subsequent to the molding operation.

It is a still further object of the present improvements to provide a method of molding a body of synthetic resin and the like about an insert made of metal in such manner that both ends of the insert are protected against obscuration by flash and the like, whereby both ends are exposed for connection without any need for subsequent trimming, cleaning and the like.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
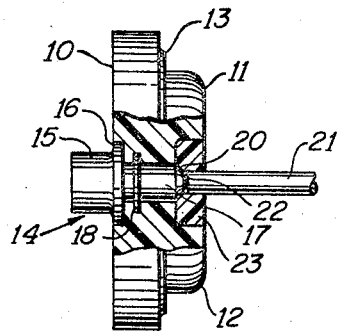
FIG. 1 is a side view, partially in elevation and partially in section, of a complete end cap or header made in accordance with the present invention.

Referring now to the drawings in detail, the new header, or end cap, will be recognized as outwardly similar to those commonly used in electrolytic capacitors, with the capacitor structure itself being conventional and therefore not illustrated or needed for understanding of the invention. The complete cap assembly thus shown in FIG. 1 comprises a molded body of a suitable material ordinarily a synthetic resin of the phenolic class, having a base cylindrical portion 10, and a reduced cylindrical extension 11 the outer edge of which is rounded as shown at 12. A small integral ridge 13 is also provided in outward spaced relation about the reduced extension of the body as illustrated.

It will be understood that the relatively enlarged base 10 constitutes the inner part of the end cap in its application to a capacitor container or can, and that the end of the latter is spun over or crimped about this section for conventional sealing attachment. The reduced extending portion 11 thus constitutes the outer end of the cap.

A metal insert, designated generally by reference numeral 14, which may be made of aluminum, is incorporated within the molded body on the center axis of the same as shown. In this particular form of the cap assembly, the insert 14, which is solid, is a screw machine part having an inner cylindrical portion 15 and, proceeding outwardly in order, a flange 16, a reduced cylindrical portion 17, and a collar or flange 18 about this last portion. The outer face of the first mentioned flange 16 is substantially in the plane of the inner face of the molded body part 10, whereby the relatively large cylindrical extension 15 of the thus incorporated insert projects away from this side and is exposed for connection with the center electrode in a conventional electrolytic capacitor.

The molded body at its outer face, in the extension 11, is formed with a coaxial cylindrical recess 19, and the end of the insert 14 will be seen to extend into this recess. Such end is crimped at its outer periphery as shown at 20, and an external connecting wire 21 is welded at 22 to the extreme end face of this portion of the insert. The recess, which will be seen to actually extend inwardly significantly beyond the end of the insert 14, is filled with a resin composition, such as an epoxy cement, and this further body 23 thus totally encloses the welded joint 22 of the wire and the insert.

Figure 2:
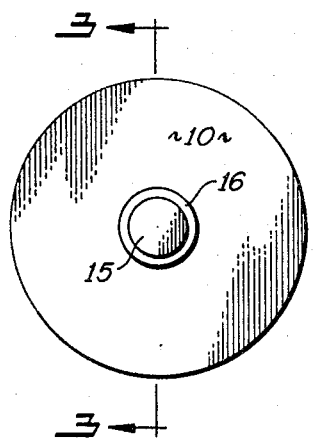
FIG. 2 is an elevation of one end of this end cap, which would be the inner end at which the metal insert of the assembly is exposed.
Figure 3:
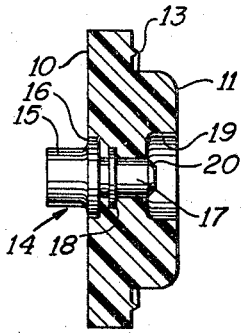
FIG. 3 is a transverse cross section on the line 3—3 in FIG. 2, showing the end cap after the mold formation of the same incorporating the insert and prior to attachment of any external wire or other connection.
Figure 4:
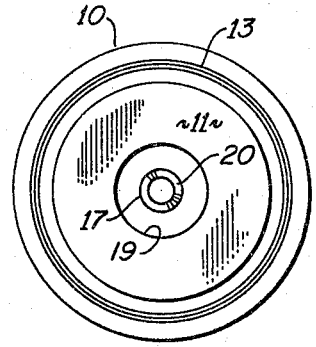
FIG. 4 is an elevation of the outer end of the end cap assembly of FIG. 3.

As indicated previously, the production of this new end cap or header comprises the distinct step of forming the assembly of the molded body and the metal insert, and this component as it is provided after the molding operation, is illustrated in FIGS 2-4. The showing of FIG. 3, in particular, emphasizes the recess in the outer end of the part in this component, and the assembly is completed by subsequent attachment of the wire to be used and the noted filling of the recess with material such as the mentioned epoxy cement, this being a pourable resin.

Figure 5:
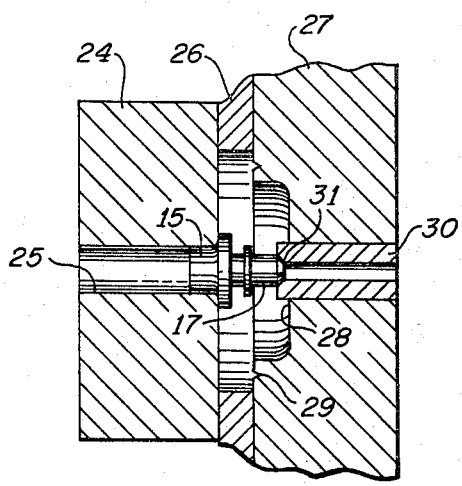
FIG. 5 is a sectional and partially fragmented view of a mold assembly for forming the end cap, with the metal insert shown positioned in the closed mold cavity.

With reference to FIG. 5, the typical mold used to produce such cap is shown as comprising a base part 24 having a bore 25 in which the inner end portion 15 of the metal insert 14 is received, an intermediate or spacer plate 26 the height of which determines the height of the resulting enlarged cylindrical portion 10 of the cap, which can thus be varied by employing spacers of different size, and a mold closure 27 having an inner face recess 28 defining the relatively reduced part of the finished cap and, in this illustration, also the encircling ridge provided by the mold face groove 29.

The mold closure or top 27 is also provided with a bore in alignment with the bore 25 of the base part, and a sleeve 30, previously of a hardened metal, is suitably fixed in this top bore to extend from the outer face of the part 27 inwardly into the upper portion 28 of the complete mold cavity. The metal insert, also as earlier indicated, is turned on a screw machine and as supplied will have a normal corner at the end of its reduced portion 17. The projection of the sleeve 30 into the mold cavity is in such dimensional relation to the length of the insert from its extreme inner end to the outer side of the flange 16, which rests in the assembly on the bottom mold part as shown, that the sleeve will forcibly engage over and swage such end in the closure of the mold.

For this swaging purpose, the sleeve 30 has, of course, a related internal diameter and an inwardly spaced bevel as shown at 31 where the metal deformation occurs. Accordingly, with these relationships established, the closure of the mold deforms the outer peripheral corner of the end of the insert 14 forcibly into the illustrated resulting crimp, and this interengagement is intentionally provided to seal off the mold cavity and prevent extrusion of the mold composition over this end face of the insert. This last-noted feature permits compression molding of the body of the cap, as distinguished in particular from transfer molding, without any skin of the composition forming over the thus protected insert end, which would of course require subsequent removal for attachment of the external wire or lead to complete the assembly. The pressure employed in the curing stage of compression molding is insufficient to extrude the composition past this force engagement.

The wall of the sleeve 30 in the top mold part 27, of course, will be seen to define the aforementioned recess 19 in the molded body, and the protrusion of the end of the insert 14 above the bottom of this recess is significant not only as providing complete encirclement of the welded joint 22 as noted in the foregoing, but also by reason of the fact that the arc created in the welding of the wire to the insert end is spaced sufficiently away from the body that it does not have any deleterious effect on the same. It will be understood that the wire 21 is brought against the insert and electric current of welding density applied across the wire and insert, both exposed externally, in any suitable manner to form the weld connection of the two. It is subsequent to the welding that the recess is filled with a pourable resin to provide the form-completing and joint protecting body of material 23.

It has been the practice to employ aluminum for the metal insert in conventional electrolytic capacitor end caps, and if such an insert has previously been anodized, the disclosed force deformation or swaging of the end will serve to break the anodic film with cleaning effect and resulting enhancement of the weldability of this end of the insert. It will be apparent that the mold assembly described does not require a drilled hole in the mold closure as in the conventional cap formation with pre-attached insert and wire, so that there is no real limitation on the size of the wire which can be added to this new end cap component. The insert is supported and centered in the mold cavity in positive manner by engagement of the same at both ends, and since the wire attachment is entirely accomplished in a separate subsequent operation, its size not only can be varied, but the wire may be headed or not or offset from the insert axis simply by using a wire of appropriately smaller diameter with a right angle bent end which is welded to the insert.

The improved formation of the end cap also permits the use of a relatively small protruding insert end, and the reduction of the exposure which is thus realized reduces the tendency of vapor loss at the joint with the plastic body to the point where such losses are inconsequential. It will also be appreciated that production molding equipment for carrying out the described method will ordinarily employ a multiplicity of cavities on the order shown in FIG. 5 and with the same formation and dimensional relationships as set forth.

Other modes of applying the principle of the invention may be employed, change being made as regards the details described, provided the features stated in any of the following claims or the equivalent of such be employed.

I therefore, particularly point out and distinctly claim as my invention:

1. The method of making a cap for insertion in the end of a capacitor can having a metal terminal and connector wire joined to one end of the terminal and supported and enclosed about the joint thereof by a body of insulation material, comprising the steps of providing an assembly of mold members which together define the configuration of a major part of said insulation body, the cavity having a base surface corresponding to one end face of the body, positioning and holding the metal terminal firmly within the cavity with one end thereof extending in shielded relation through said base surface for projecting exposure at said one end face of the major body part, the surface of the cavity opposed to said base surface having an outer annular portion at a spacing from the base surface which is appreciably greater than the extent of the terminal therefrom within the cavity and an inwardly offset inner portion extending to the other end of the terminal, so that such opposed cavity surface defines the other end of the major body part as having a recess of appreciable depth coincident with the other end of the terminal for exposure of the latter, molding insulating compound in said cavity to form said major body part with the terminal embedded partially in the same, thereafter affixing the connector wire to said other end of the thus embedded terminal within said recess, and then filling the recess with settable insulating composition to form a minor part of said body which fully embeds the joint of the terminal and wire and has an outer surface substantially flush with the other end face of the major body part.

2. The method of claim 1, wherein the major body part is formed by compression molding.

3. The method of claim 1, wherein the connector wire is affixed to the terminal by welding.

4. The method of claim 1, wherein said opposed surface of the cavity at the offset inner portion thereof swages and thereby seals said other end of the terminal.

5. The method of claim 1, wherein the major body part is formed by compression molding, and the connector wire is attached by welding to the terminal.

6. The method of claim 1, wherein the opposed surface of the cavity at the offset inner portion thereof swages and thereby seals said other end of the terminal, and the major body part is formed by compression molding.

7. The method of claim 1, wherein the opposed surface of the cavity at the offset inner portion thereof swages and thereby seals said other end of the terminal, and the connector wire is affixed by welding to the embedded terminal.

8. The method of claim 7, wherein the major body part is formed by compression molding.

References Cited
UNITED STATES PATENTS

| | | | |
|---|---|---|---|
| 2,222,755 | 11/1940 | Watson | 264—275 X |
| 2,037,409 | 5/1960 | Coll. | |
| 2,958,844 | 11/1960 | Smith et al. | 174—52 X |
| 3,107,197 | 10/1963 | Stein et al. | |
| 3,193,612 | 7/1965 | Gault | 174—52 |

JOHN F. CAMPBELL, *Primary Examiner.*

C. E. HALL, *Assistant Examiner.*